Sept. 22, 1970      E. GARCZYNSKI      3,529,859
QUICKLY RELEASABLE DOVETAIL CLAMP
Filed Aug. 6, 1968
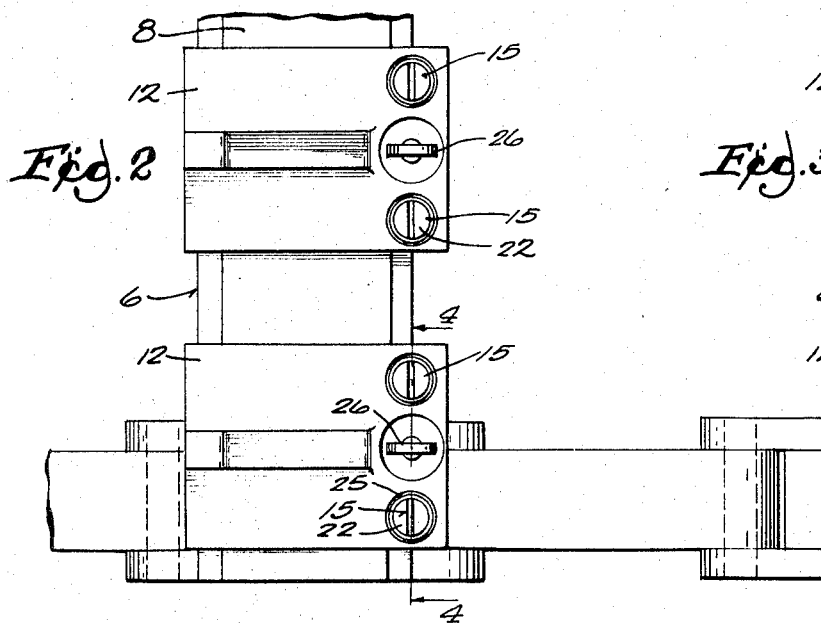
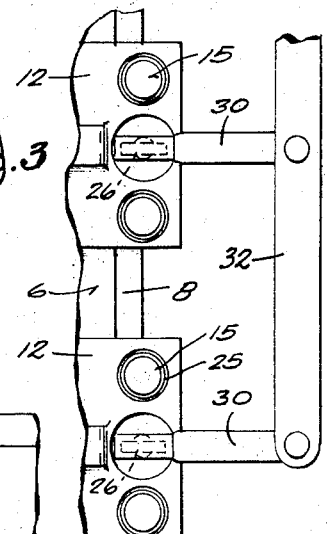
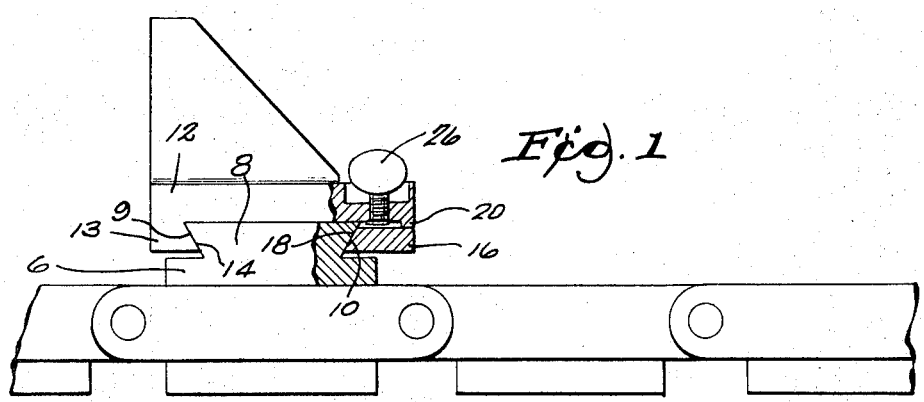
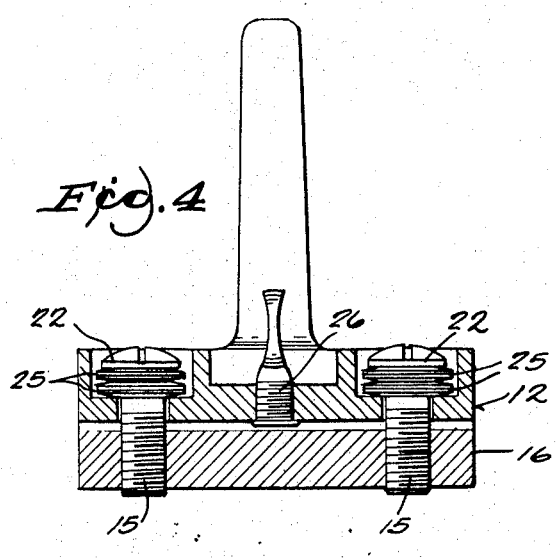
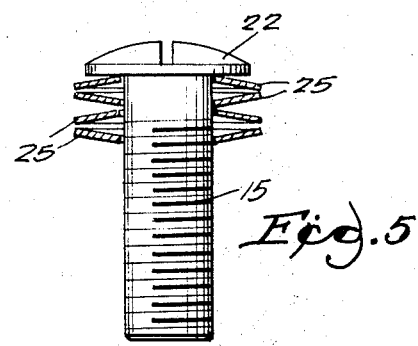
INVENTOR
EDWARD GARCZYNSKI
BY Wheeler, Wheeler, House & Clemens
ATTORNEYS United States Patent Office 3,529,859
Patented Sept. 22, 1970

3,529,859
QUICKLY RELEASABLE DOVETAIL CLAMP
Edward Garczynski, Sheboygan Falls, Wis., assignor to Kohler General, Inc., Sheboygan Falls, Wis., a corporation of Wisconsin
Filed Aug. 6, 1968, Ser. No. 750,645
Int. Cl. F16b 2/02
U.S. Cl. 287—189.36                 10 Claims

ABSTRACT OF THE DISCLOSURE

A slide reciprocable along a dovetail way has one fixed margin complementary to the way, an opposing bar with a beveled surface being biased by Belleville spring means into clamping engagement with the way. The Belleville spring washers require little movement between way-engaging and way-releasing positions. They are mounted and guided on pressure adjusting screws. When spring adjustment is correct, a very slight movement of a thrust element acting on the bar in opposition to the Belleville spring means will lock or release the slide.

BACKGROUND OF INVENTION

There is need in the machine tool industry and elsewhere for a quick-acting lock engageable or releasable instantly and with little effort and requiring only a limited range of movement to lock a slide in position or to release it for adjustment.

SUMMARY OF INVENTION

In the instant device a bar engaging one side of a dovetail way is pivoted to the slide at one side for movement of its other side to and from clamping engagement with a beveled face of the way. Guide and pressure-regulating screws passing loosely through openings in the slide are threaded in the clamp bar and have their heads in pockets in the slide in which there are Belleville springs encircling the screws.

The springs act through the screws to bias the movable bar toward full clamping engagement with the way. The bevel cams the slide into corresponding engagement with the other side of the way. To release the clamping action all that is required is a very slight pressure on the bar in opposition to the spring bias. One or more thumbscrews threaded through the slide into bar engagement will ordinarily suffice. In the case of a very long slide there may be a number of screws interconnected for concurrent operation.

BRIEF DESCRIPTION OF DRAWINGS

FIG. 1 is a view in cross section through a machine tool table and a slide clamped thereto in accordance with my invention.

FIG. 2 is a fragmentary plan view of the structure shown in FIG. 1.

FIG. 3 is a fragmentary detail in plan showing a modified embodiment of the device of FIGS. 1 and 2.

FIG. 4 is a view taken in section on the line 4—4 of FIG. 2.

FIG. 5 is a view in side elevation on a greatly enlarged scale showing a guide screw and Belleville spring means pre-assembled thereon.

DESCRIPTION OF THE PREFERRED EMBODIMENT

The machine tool table 6 is provided with a dovetail way 8 which has oppositely beveled clamp surfaces 9 and 10. The slide 12 reciprocable longitudinally of the way has an integral flange 13 with a surface 14 complementary to, and engaged with, the surface 9.

Beneath the other side of slide 12 is a clamp bar 16 which has a clamp surface 18 complementary to, and releasably biased against, the surface 10. At or near its outer margin the bar 16 preferably has means for pivoting its outside edge with respect to the slide. This may comprise a continuous or discontinuous rib 20.

The bar is biased under adjustable spring pressure to engage its clamp surface 18 with the dovetail surface 10, at the same time camming the surface 14 of the slide against surface 9 of the dovetail way. Spring pressure adjustment may be accomplished by any one of numerous expedients. I prefer to have guide screws 15 threaded for spring adjustment purposes into the pressure bar 16 and loosely passing through the slide. One or several may be provided according to slide length. Two are shown.

The slide has for each screw a pocket which accommodates the screw head 22 and one or more Belleville springs 25 confined beneath the head to bias the side face 18 of the clamp bar 16 upwardly into clamping engagement with the beveled surfaces 10 of the slide. The bar 16 may pivot on rib or ribs 20 to and from clamping engagement of its free side face 18 with the surface 10 of the way. Because of the beveled surfaces and resulting camming action relatively little spring bias is required to lock the slide securely in any selected position on the way.

Release of the slide for movement along the way requires but a moment because the Belleville springs 25 have such a short range of movement between full bias and full release. Of the many available means for compressing the springs to relieve clamping pressure, set screws are preferred. At suitable intervals thumbscrews 26 are threaded in the slide and extend through it into engagement with the clamp bar in opposition to the spring pressure communicated through screws 15. If there are many such screws 26 required for an elongated slide, they may be provided with levers 30 connected by link 32 for concurrent operation as in FIG. 3. This may be done manually or by power.

I claim:
1. In a quickly releasable slide clamp, a way, a reciprocably adjustable slide mounted on the way, normally operable clamp means for anchoring the slide in a fixed position on the way, spring means for biasing the clamp means toward the way for anchoring the slide, and means for overcoming the bias of the spring means for releasing the slide for reciprocation.

2. A slide clamp according to claim 1 in which the way is a dovetail way and the slide has a flange complementary to the way at one side thereof, the clamp means comprising a bar having means connecting it movably with the slide and positioning it for engagement with the other side of the way, the bar and way having complementary beveled faces, the spring means urging said bar in a direction to effect camming engagement of said faces.

3. A slide clamp according to claim 2 in which the connecting means comprises a headed stud attached to the bar and passing freely through a hole with which the slide is provided.

4. A slide clamp according to claim 3 in which the slide has a recess in which the head of the stud is disposed, the spring means being in the recess and confined under compression between the stud and the slide.

5. A slide clamp according to claim 3 in which the spring means is a Belleville spring encircling the stud between the head and the bar.

6. A slide clamp according to claim 5 in which the spring is continuously under compression and the stud is a screw threadedly adjustable respecting the bar for regulating compression of the spring.

7. A slide clamp according to claim 1 in which the spring means is a Belleville compression spring, the means for overcoming the bias of said spring means being adjustably mounted on the slide and bearing on the clamp means in opposition to the bias of the spring means.

8. A slide clamp according to claim 1 in which the clamp means comprises a bar bearing on the way and movable to and from clamping engagement therewith, the slide engaging the way in opposition to the bar and having an opening for a bar-supporting stud with which the bar is provided, a Belleville spring confined under compression between the bar and the stud and constituting said spring means, and rib means disposed between the bar and slide at the side of the stud remote from said way and constituting means on which the bar pivots in moving to and from clamping engagement with the way.

9. A slide clamp according to claim 1 in which the bar is elongated and a plurality of spring means spaced along the bar bias it toward clamping engagement with the way, and a plurality of means for overcoming such bias are provided and have means interconnecting them for concurrent operation.

10. A slide clamp according to claim 1 in which the way is a dovetail way and the slide has a flange complementary to the way at one side thereof, the clamp means comprising a bar having means connecting it movably with the slide and positioning it for engagement with the other side of the way, the bar and way having complementary beveled faces, the spring means urging said bar in a direction to effect camming engagement of said faces, said bar and slide being elongated and the bar having longitudinally spaced screws adjustably threaded therein and extending through openings with which the bar is provided, Belleville springs encircling the screws and held thereby under compression against the slide and constituting said spring means, the means for overcoming the bias of said springs comprising screws threaded to the slide and in thrust engagement with the bar and provided with laterally projecting levers having link means connecting the levers for concurrent operation of the screws to release the clamping engagement of the bar with the way.

References Cited

UNITED STATES PATENTS

| | | | |
|---|---|---|---|
| 1,977,431 | 10/1934 | Des Isles | 248—226.3 |
| 2,087,217 | 7/1937 | Cohen | 248—226.4 |
| 2,735,519 | 2/1956 | Frischmann. | |
| 2,795,859 | 6/1957 | Buschbach | 248—226 X |

DAVID J. WILLIAMOWSKY, Primary Examiner

W. L. SHEDD, Assistant Examiner

U.S. Cl. X.R.

90—58; 77—63; 248—226